(12) United States Patent
Weber

(10) Patent No.: US 11,291,996 B2
(45) Date of Patent: *Apr. 5, 2022

(54) REAGENT RESERVOIR FOR FLUIDS

(71) Applicant: THINXXS MICROTECHNOLOGY AG, Zweibrücken (DE)

(72) Inventor: Lutz Weber, Zweibrücken (DE)

(73) Assignee: THINXXS MICROTECHNOLOGY AG, Zweibrücken (DE)

(*) Notice: Subject to any disclaimer, the term of this patent is extended or adjusted under 35 U.S.C. 154(b) by 277 days.

This patent is subject to a terminal disclaimer.

(21) Appl. No.: 16/215,195

(22) Filed: Dec. 10, 2018

(65) Prior Publication Data

US 2019/0105654 A1 Apr. 11, 2019

Related U.S. Application Data

(63) Continuation of application No. 15/322,891, filed as application No. PCT/EP2015/063997 on Jun. 22, 2015, now Pat. No. 10,183,293.

(30) Foreign Application Priority Data

Jul. 1, 2014 (EP) .................................. 14175207

(51) Int. Cl.
*B01L 3/00* (2006.01)

(52) U.S. Cl.
CPC ..... *B01L 3/502738* (2013.01); *B01L 3/50273* (2013.01); *B01L 3/502707* (2013.01);
(Continued)

(58) Field of Classification Search
CPC ....... B01L 3/502707; B01L 2200/0689; B01L 2300/0816; B01L 2300/0887;
(Continued)

(56) References Cited

U.S. PATENT DOCUMENTS

| 9,005,546 B2 | 4/2015 | Weber |
| 9,108,132 B2 | 8/2015 | Weber |

(Continued)

FOREIGN PATENT DOCUMENTS

| DE | 102009009728 A1 | 9/2010 |
| DE | 102010042740 A1 | 4/2012 |

(Continued)

*Primary Examiner* — Samuel P Siefke
(74) *Attorney, Agent, or Firm* — Lucas & Mercanti, LLP; Klaus P. Stoffel

(57) ABSTRACT

A reagent reservoir for fluids, including a storage chamber connected to a duct for conducting fluid out of, into and/or through the storage chamber. The duct includes a duct section delimited by a substrate and a film joined to the substrate. The duct is sealed and is openable at a predetermined breaking point by deflecting the film. The film also delimits the storage chamber and covers a recess in the substrate which forms the duct section. A sealing wall that seals the duct and is integrally joined to the substrate is placed in the recess. The predetermined breaking point is formed by a breakable joining region between the film and edge portion of the sealing wall facing the film. The dimensions of a peripheral area of the sealing wall, which is formed in the edge portion and runs parallel to the film, determine the surface area of the joining region.

17 Claims, 5 Drawing Sheets

(52) U.S. Cl.
CPC ......... *B01L 3/523* (2013.01); *B01L 2200/027* (2013.01); *B01L 2200/028* (2013.01); *B01L 2200/0689* (2013.01); *B01L 2300/0816* (2013.01); *B01L 2300/0887* (2013.01); *B01L 2300/123* (2013.01); *B01L 2400/0481* (2013.01); *B01L 2400/0487* (2013.01); *B01L 2400/0655* (2013.01)

(58) Field of Classification Search
CPC ......... B01L 2300/123; B01L 3/502738; B01L 3/523; B01L 2400/0481; B01L 2400/0487; B01L 2400/0655; B01L 3/50273
See application file for complete search history.

(56) References Cited

U.S. PATENT DOCUMENTS

| | | |
|---|---|---|
| 9,149,802 B2 | 10/2015 | Weber |
| 9,168,524 B2 | 10/2015 | Rothacher |
| 9,211,538 B2 | 12/2015 | Weber |
| 9,309,873 B2 | 4/2016 | Schmidt |
| 2010/0044918 A1 | 2/2010 | Lee |
| 2010/0166609 A1 | 7/2010 | Hagiwara |
| 2012/0214254 A1 | 8/2012 | Schmidt |
| 2013/0263940 A1 | 10/2013 | Weber |

FOREIGN PATENT DOCUMENTS

| | | |
|---|---|---|
| DE | 102011002571 A1 | 7/2012 |
| DE | 102011003856 A1 | 8/2012 |
| EP | 2647435 A1 | 10/2013 |
| EP | 2679307 A1 | 1/2014 |
| EP | 2687290 A1 | 1/2014 |
| WO | 2009071078 A1 | 6/2009 |

REAGENT RESERVOIR FOR FLUIDS

CROSS-REFERENCE TO RELATED APPLICATIONS

The present application is a Continuation Application of U.S. patent application Ser. No. 15/322,891, filed Dec. 29, 2016, which is a 371 of International application PCT/EP2015/063997, filed Jun. 22, 2015, which claims priority of EP 14 175 207.1, filed Jul. 1, 2014, the priority of these applications is hereby claimed and these applications are incorporated herein by reference.

BACKGROUND OF THE INVENTION

The invention relates to a reagent reservoir for fluids as part of a microfluidic flow cell for the analysis and/or synthesis of substances or as a separate module, comprising a storage chamber connected to a channel for conveying fluid out of, into and/or through the storage chamber, the channel having a channel area which is delimited by a substrate and by a film connected to the substrate and in which the channel is closed and can be opened at a predetermined breaking point by deflection of the film, said film connected to the substrate also delimiting the storage chamber in addition to the channel area.

A reagent container of this kind is disclosed in WO 2009/0710781 A1. The storage chamber of this known reagent reservoir is formed by a thermoformed area of the film which delimits the channel area and is otherwise plane. The film is composed of an aluminum layer with a plastic coating directed toward the inside of the storage chamber. Outside the storage chamber and the channel area, and at the predetermined breaking point, the film is adhesively bonded and/or welded to a plane surface of the substrate or of a further film covering said surface.

The surface extent of the predetermined breaking point produced by welding and/or adhesive bonding between the plastic coating of the film and the plane surface of the substrate can only be predefined with difficulty. Variations result especially from the behavior of the plastic coating of the film during welding, the distribution of the temperature generated by a welding tool, the attainable width of the weld path of ca. 1 mm, the positioning accuracy of the welding tool, and therefore the reproducibility of the distance of the predetermined breaking point from the storage area. Correspondingly, the forced needed to break open the predetermined breaking point also varies undesirably.

SUMMARY OF THE INVENTION

The object of the invention is to make available a novel flow cell which is of the type mentioned at the outset and which has a channel area with a predetermined breaking point, wherein the force for breaking open the predetermined breaking point lies within a narrow tolerance range.

This object is achieved, according to the invention, in that the film covers a recess in the substrate forming the channel area, and a sealing wall that closes the channel and is integrally connected to the substrate is arranged in the recess, in that the predetermined breaking point is formed by a breakable connection area between the film and an edge portion of the sealing wall directed toward the film, and in that the dimensions of an edge surface of the sealing wall formed in the edge portion and parallel to the film determine the surface extent of the connection area.

Since the connection area that forms the predetermined breaking point is concentrated, according to the invention, on the edge surface of the sealing wall that reaches as far as the film, the connection area has a defined recess and position that are independent of the welding conditions. Variations in the force needed to break open the predetermined breaking point are correspondingly low.

Said edge surface can be approximated to a line which, for example, runs perpendicularly with respect to the direction of flow of the fluid.

The channel can preferably be opened by fluid pressure bearing on the predetermined breaking point or by mechanical and/or pneumatic deflection of the film. Whereas fluid pressure can be built up, for example, by forcing out a storage chamber with a flexible film wall, an operating device provided for the flow cell could be used for the mechanical and/or pneumatic breaking open of the predetermined breaking point.

It will be appreciated that the film on the edge portion can be adhesively bonded and/or welded to the edge surface of the sealing wall. Alternatively or in addition, a releasable clamping connection could be produced by a clamp element that is connected movably to the flow cell and acts on the film.

The sealing wall is preferably formed integrally with the substrate in one work cycle by means of injection molding.

In a particularly preferred embodiment of the invention, the edge surface of the sealing wall terminates flush with the opening edge of the recess formed in the substrate. It is thus possible to ensure that, with its edge portion directed toward the film, the sealing wall reaches as far as the film, and that the film can be adhesively bonded and/or welded both to the substrate and also to the edge portion of the sealing wall in one work cycle.

While it is possible to configure the sealing wall in a ring shape, blocking off a correspondingly radial flow of fluid of a channel area forming a through-hole, the sealing wall in the preferred embodiment of the invention is configured as a sealing web which is connected at its ends to the substrate and which crosses the recess in the substrate.

The thickness of the sealing wall preferably decreases toward the covering film, in particular in such a way that the film bears only linearly against the edge portion of the sealing wall. This tapering of the thickness of the sealing wall not only permits an almost linear edge portion but also quite a considerable depth of the recess forming the channel area and, as a result, a low flow resistance during transport of the fluid. In addition, this increases the mechanical stability of the sealing wall to forces that act on it during the injection molding and welding.

Accordingly, the cross section of the sealing wall can, for example, have the shape of a triangle or partial circle.

In a further embodiment, the edge portion of the sealing wall bears with a flattened portion against the film. The length of the flattened portion in the direction of flow, and therefore the length of the predetermined breaking point in this direction, is preferably less than 0.5 mm, in particular less than 0.1 mm, if appropriate less than 0.05 mm. The height of the tapering sealing wall, and therefore of the channel-forming recess of the substrate, is preferably between 0.1 mm and 1 mm, in particular between 0.2 mm and 0.5 mm.

The recess preferably opens toward a plane surface of a preferably plate-shaped substrate, and the film covering the recess is preferably a plane film.

In a further embodiment of the invention, the channel, in the channel area having the predetermined breaking point, is narrowed or widened in cross section by comparison with adjoining channel areas. A sealing web can be correspondingly lengthened or shortened. Since the force for breaking open the predetermined breaking point depends on the geometry of the connection area between the film and the sealing web, the breaking-open force can be adapted by suitable choice of the widening or narrowing. The width of the linear sealing web is preferably between 1 mm and 10 mm, in particular between 2 mm and 6 mm. The breaking-open force applied by a mechanical actuator compressing the storage area is preferably below 50 N, in particular below 20 N, if appropriate below 10 N.

The storage chamber can be formed by a depression in the substrate, by a bulge in the film, or both by a depression in the substrate and also a deflection in the film.

Outside the storage area, the film and/or the substrate preferably have projections and/or recesses for forming mutual abutments, which permit controlled positioning of the film relative to the substrate.

The predetermined breaking point can particularly preferably be broken open by deformation of a portion of the film that delimits the storage chamber.

In a particularly preferred embodiment of the invention, the film delimits the storage chamber and the channel continuously as far as a mouth where the channel opens into a discharging and/or mixing chamber, or as far as a through-hole in the substrate connecting the storage chamber fluidically to the discharging or mixing chamber.

The film is expediently a laminate composed of a metal layer, in particular an aluminum layer, preferably a soft-annealed aluminum layer, and of a plastic layer, wherein the plastic layer is directed toward the fluid. The laminate can additionally have further layers.

The thickness of the plastic layer is expediently less than or equal to the width of the edge surface, directed toward the film, of the sealing wall in the longitudinal direction of the channel or the direction of flow. By this measure, the mass of the material to be melted is expediently kept low, as a result of which the reproducibility of the weld connection increases.

A surface area of the substrate provided for welding to the film preferably has a furrowed structure, possibly except for the edge surface of the sealing wall. The strength of the weld connection between the film and the substrate can be greatly increased by the furrowed structure. Furrows with widths and heights of between 0.1 mm and 0.5 mm are preferably formed.

In a further embodiment of the invention, the storage chamber, on its side directed away from the film, has in each case an attachment stub that can be closed by welding, wherein the attachment stub is preferably arranged in a depression in a plane bottom surface of the substrate and, in the closed state, is set back in relation to a surface of the substrate directed away from the film. The reagent reservoir can then advantageously be placed with its bottom surface flush on a plane carrier surface. The internal diameter of the attachment stubs is preferably in the range of 0.5 mm to 2 mm, and the height of the attachment stubs to be welded is preferably in the range of 0.5 mm to 4 mm. The wall thickness of the attachment stubs to be welded is preferably in a range of 0.5 mm to 2 mm.

In a further embodiment of the invention, the aforementioned discharging and/or mixing chamber forms a socket for connecting the reagent reservoir to an appliance, in particular to a lateral flow analysis chip, in which a functionalized lateral flow membrane, generally used for in situ analyses, is enclosed in a plastic housing. The socket of the reagent reservoir preferably has positioning and/or fixing elements, such as snap-fit closures or undercuts, which with respect to the mutual position of the housings of reagent reservoir and analysis chip permit a reproducible mechanical connection to the housing of the lateral flow analysis chip. The position of the lateral flow membrane relative to the discharge channel of the reagent reservoir is accordingly reproducible, such that the stored fluid, for example a wash buffer, can be brought into contact with the lateral flow membrane reproducibly when the storage area is actuated.

The reagent reservoir according to the invention can also be integrated in such an analysis chip, for example, and can have a housing in common with the latter.

In a particularly preferred embodiment of the invention, the substrate is connected to an actuator and/or lid, preferably non-releasably, said connection being able to be produced, for example, by a film hinge that allows the lid or actuator to be folded over in a defined pivoting direction.

The actuator preferably has a stamp element which can be guided through an opening in the lid and which deforms the portion of the film forming the storage chamber; for example, by folding over and/or moving the actuator, the height of the storage chamber can thus be reduced by deformation of the film, in particular by plastic deformation of the film, wherein the stamp element, in an end position of the actuator, preferably completely annuls the height of the storage chamber. In this way, the storage chamber can be emptied in a reproducible manner.

In the end position, the actuator can expediently be fixed on, in particular latched onto, the substrate, such that it is possible to tell from the fixed position that the reservoir is empty.

The lid can also be expediently fixed on the substrate, in particular clamped and/or latched onto the substrate.

Preferably, the lid together with the substrate forms the abovementioned discharging and/or mixing chamber.

The reagent reservoir can be combined with a carrier element for a dry reagent, wherein the carrier element with the dry reagent is preferably prefabricated and, at the time of production of the reagent reservoir, is mounted thereon. For this purpose, in addition to having an area in which the dry reagent is applied, the carrier element also has a connection area preferably integrally connected thereto. The connection area can have a screw connection or snap-fit connection. Alternatively, a conical plug area is particularly preferred, e.g. corresponding to the Luer standard, which permits simple mounting of the carrier element on a reagent reservoir substrate having a corresponding conical plug area by means of an interference fit.

The reagent reservoir can be combined with a carrier element for receiving a solid or liquid sample to be analyzed, e.g. blood, saliva, stool, a water sample, food, plant samples or soil sample, wherein the sample is preferably applied first to the carrier element, after which the carrier element is connected to the reagent reservoir before the latter is actuated.

In addition to having a receiving area on which a sample volume can be applied preferably in a reproducible manner, the carrier element has a connection area that is preferably integrally connected thereto. The connection area can comprise a screw connection or snap-fit connection. A conical plug area is preferable, which permits particularly simple mounting of the carrier element on the substrate of the reagent reservoir, in a corresponding conical plug area of the substrate by means of an interference fit. Preferably, the sample-receiving area or at least the sample of the carrier element is substantially completely enclosed by a channel area or chamber area of the reagent reservoir, such that the reagent emerging from the storage chamber into the channel area can flow over the sample and be washed off from the sample carrier. Alternatively, by comparison with the surface of the sample-receiving area of the carrier, the channel adjoining the carrier element can have a much smaller channel cross section and, for example, can be routed in a meandering shape over the sample.

The dry reagent and/or the sample can come to be arranged in the channel or in the discharging chamber.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
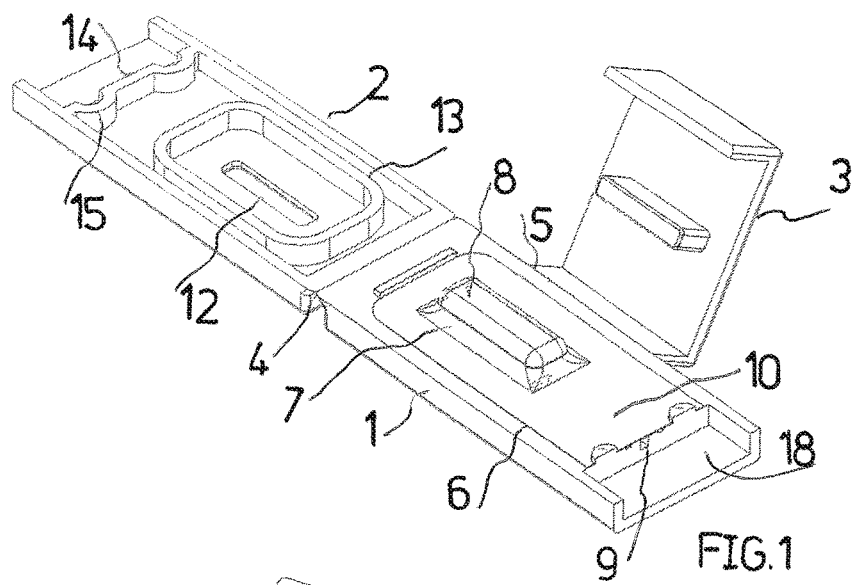
FIGS. 1 to 3 show a reagent reservoir according to the invention composed of a plastic part and of a laminate film, with mutually movable components in different positions.
Figure 2:
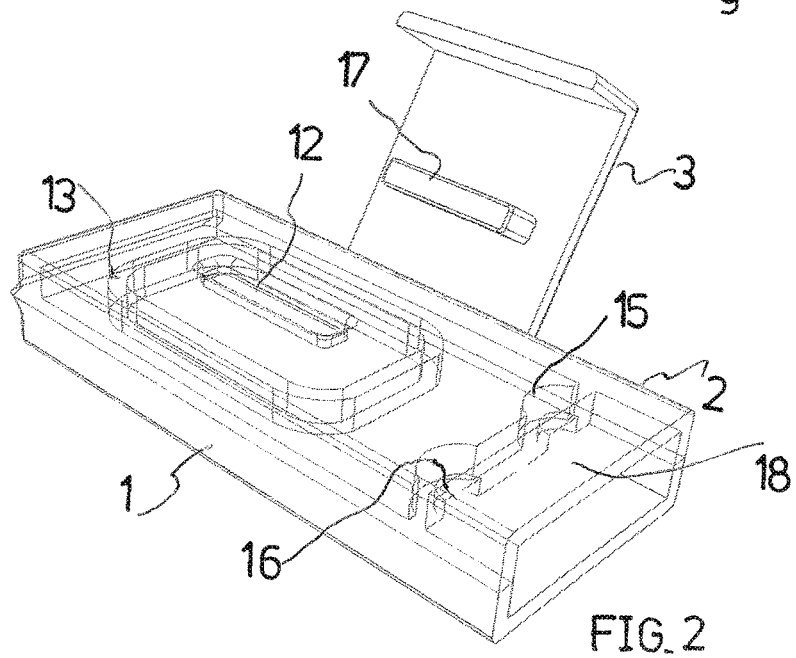
Figure 3:
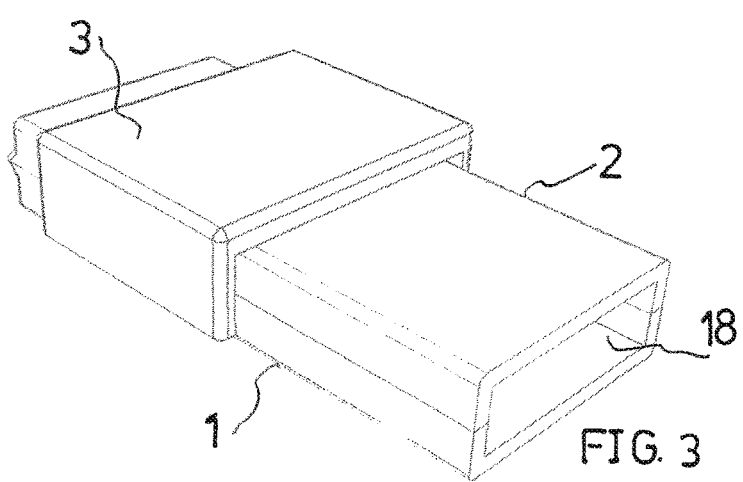

A reagent reservoir shown in FIGS. 1 to 3 comprises a substrate 1 produced by injection molding from PMMA, PC, PEEK, PP, PE, COC, PP or other plastics, preferably polyolefins. In the example shown, the substrate 1 is connected integrally in each case to a lid 2 and to an actuator 3 via a respective film hinge 4, 5.

The substrate 1 is welded to a film 6. In the example shown, this is a laminate film composed of a soft-annealed aluminum layer and a plastic layer. A bulge 7 of the film 6 forms a storage space 8 between the film 6 and the substrate 1. The film 6 extends past the storage space 8 to an end opening 9 of a channel 10, the latter communicating with the storage space 8 and opening into a discharging chamber and/or mixing chamber 18 of the reagent reservoir.

In the channel 10 formed by a groove in the substrate 1 and covered by the film 6, a sealing wall 11 is located inside a widening 42 of the groove (best seen in FIG. 4), and the end edge of the sealing wall 11 directed toward the film 6, like the surface of the substrate 1 covered by the film 6, is welded to the film 6.

The lid 2 has an elongate opening 12 which lies opposite the storage space 8, when the lid 2 is folded over onto the substrate 1, and which is adapted to the elongate shape of the storage space 8. The opening 12 is surrounded by an annular wall 13 which is produced integrally with the lid 2 and by which the storage space is enclosed all the way round when the lid 2 is folded over. A transverse wall 14 with niches 15, in which seat projections 16 in the substrate 1 engage when the lid 2 is folded over, ensures, together with a web projection 19, a stable clamped fit of the lid 2 on the substrate 1 and a reproducible positioning of the opening 12 relative to the storage space 8.

Figure 4:
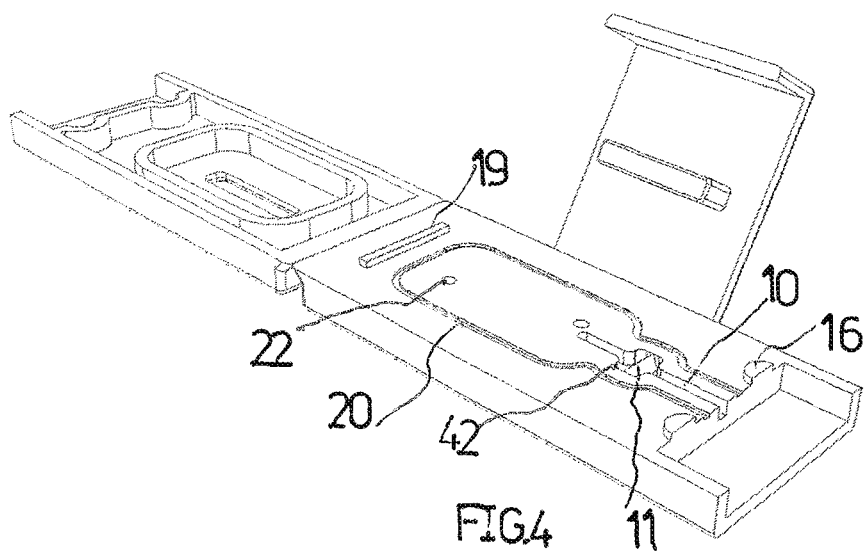
FIGS. 4 and 5 show the plastic part of the work reservoir from FIGS. 1 to 3 in different perspective views.

As can be seen from FIG. 4, which shows the substrate 1 without the film 6, a groove 20 is formed in the substrate 1, said groove 20 surrounding the storage space 8 and further extending along the channel 10. The groove 20 ensures a particularly firm weld connection that seals off the storage space 8 and the channel 10. To improve the weld connection, the substrate surface resting against the film 6 additionally has a furrowed structure (not shown).

Figure 5:
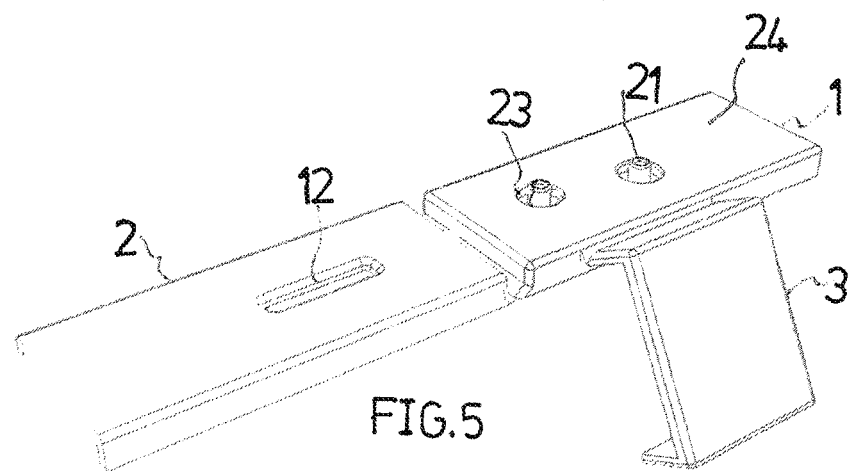

As can be seen from FIGS. 4 and 5, two opening channels 22, each comprising an attachment stub 21, open into the storage space 8. The attachment stubs 21 each protrude outward from the bottom of a depression 23. After the storage space 8 has been filled and air removed, the attachment stubs 21 can be welded in such a way that their free ends are set back in relation to the plane bottom surface 24 of the substrate 1. Advantageously, the reservoir can thus be placed with its bottom surface 24 in a stable position on an even support surface.

It will be appreciated that the parts 1 to 3 interconnected by the film hinges 4, 5 could also be produced as individual parts independent of each other.

To withdraw a reagent contained in the storage space 8, the actuator 3 can be pivoted through 180°, whereupon a stamp element 17 of the actuator 3 passes through the opening 12 and presses the storage space 8 together. As this happens, the weld between the film 6 and the edge of the sealing wall 11 tears, which results in the reagent being withdrawn in a controlled flow through the channel 10.

In its end position, the stamp element 17 almost reaches the surface of the substrate 1 and is only separated from the latter by the plastically deformed film 6.

The emptying of the storage space 8 through plastic deformation of the film 6 could also be effected by a stamp that forms part of an operating appliance.

During the production of the reagent reservoir described above, the substrate 1, if appropriate together with the lid 2 and with the actuator 3, is produced in a single manufacturing step, preferably by injection molding. The production of the shaped film 6 takes place in a further step. In a third manufacturing stage, the substrate and the film 6 are welded to each other, and the storage space 8 and the channel 10 are thus formed. Thereafter, the fluid to be stored is introduced through the attachment stubs 21 and the openings 22 into the storage space 8, such that the latter is almost completely filled, preferably filled to more than 95% of its storage volume. Finally, the attachment stubs 21 are welded in order to hermetically seal the storage space such that it is stable when stored. The effect of the heat during the welding is preferably controlled such that the welding procedure is completed in less than 5 seconds, in particular in less than 2 seconds, such that harmful heating of the stored reagent can be avoided as far as possible.

The reagent reservoir described above can be varied in accordance with the illustrative embodiments described with reference to FIGS. 6 to 16.

Figure 6:
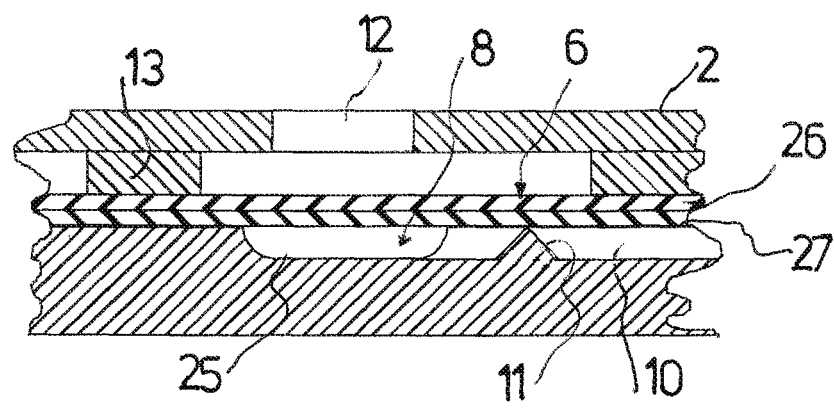
FIGS. 6 and 7 show details of possible embodiments of the reagent reservoir from FIGS. 1 to 3, in partial cross sections.

FIG. 6 shows a detail of a reagent reservoir with a substrate 1 and with a lid 2 where, in contrast to the illustrative embodiment in FIGS. 1 to 5, a storage space 8 is formed not by a bulge of the film 6 but by a depression 25 in the substrate 1. As in the illustrative embodiment described above, the film 6 is composed of a laminate of an aluminum layer 26 and of a plastic layer 27. The aluminum layer 26 directed away from the reservoir interior preferably has a thickness of between 10 and 150 µm, in particular between 30 and 100 µm. The thickness of the plastic film 27, preferably made from PP or PE, is preferably between 10 and 100 µm, in particular between 20 and 50 µm. The plastic material of the film 6 and the plastic material of the substrate 1 preferably match. In contrast to the illustrative embodiment shown, a laminate with further layers could also be used, or alternatively, in order to form the storage chamber 8, a single-layer or multi-layer plastic film could be used.

Figure 7:
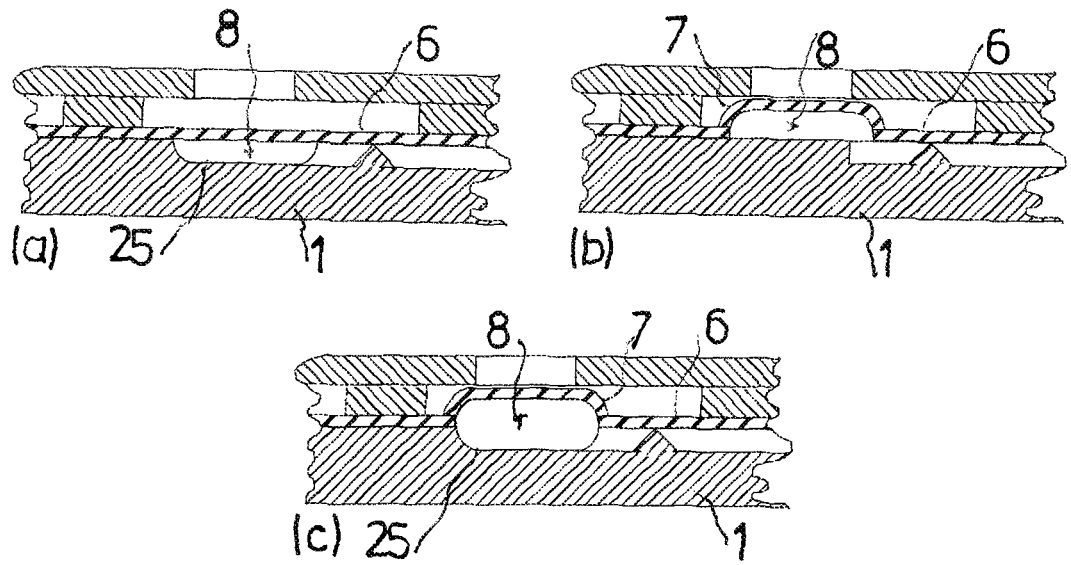

FIG. 7 shows the various possibilities for the formation of a storage space 8. According to FIG. 7a, a storage space 8 is formed by a depression 25 in the substrate 1, as in the illustrative embodiment in FIG. 6. FIG. 7b corresponds to the illustrative embodiment in FIGS. 1 to 5, with a storage space 8 formed by a bulge 7 of the film 4. FIG. 7c shows a reagent reservoir with a storage space 8 which is formed both by a depression 25 in the substrate 1 and also by a bulge 7 in the film 6.

Independently of the nature of the formation of the storage space 8, the sealing wall 11 preferably has an end face which is directed toward the film 6 and of which the width in the longitudinal direction of the channel is less than or equal to the thickness of a plastic layer of the film 6 welded to it. Advantageously, the volume of material to be melted during the welding is thereby reduced and the reproducibility of the weld is improved.

Figure 8:
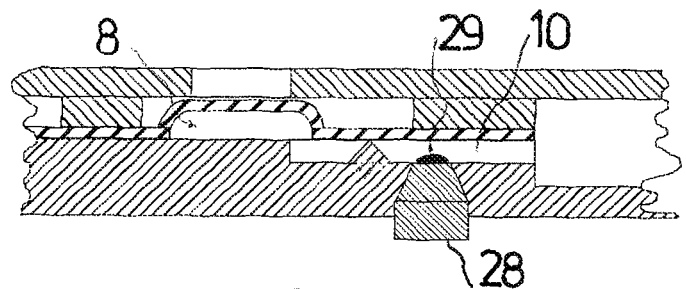
FIGS. 8 and 9 show partial cross sections through reagent reservoirs according to the invention, combined with a carrier for a dry reagent.

Illustrative embodiments of a reagent reservoir shown in FIG. 8 each have a carrier element 28 for receiving dry reagent 29, e.g. a primer, a reagent for lysis, or functionalized or magnetic beads, wherein, in the course of emptying of the reagent reservoir, a desired further reagent can be produced, by resuspension and mixing, from the dry reagent and from the fluid stored in the storage space 8. According to the illustrative embodiment in FIG. 8, the dry reagent 29 comes to be arranged in the channel 10, such that it is washed off from the carrier element 28 by the fluid flowing from the storage space 8.

Figure 9:
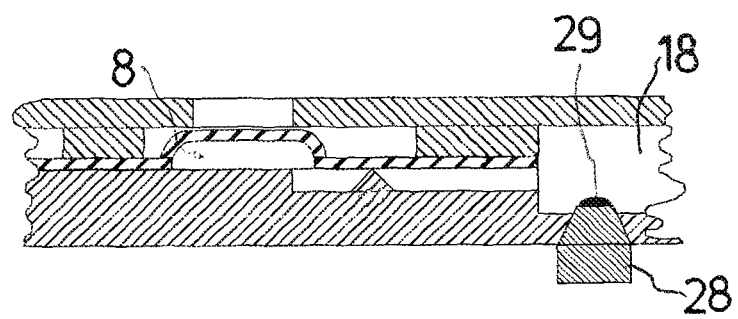

FIG. 9 shows an arrangement of the dry reagent 29 in the discharging chamber 18. With the chamber 18 in this case serving as mixing chamber, the dry reagent 29 is dissolved by the emerging fluid, e.g. by diffusion and incubation. This dissolution process can be supported by movement of the fluid (agitation), by mechanical means (not shown) or by fluid movements.

Whereas the dry reagent 29 is shown here as being introduced via the carrier element 28, a dry reagent could also be introduced directly into the chamber 18 before closure of the lid 2.

Advantageously, the carrier elements 28 with the dry reagent can be prefabricated as separate parts and, in the course of the production of the reagent reservoir, can be mounted in a fluid-tight manner by means of a conical interference fit or by welding.

Figure 10:
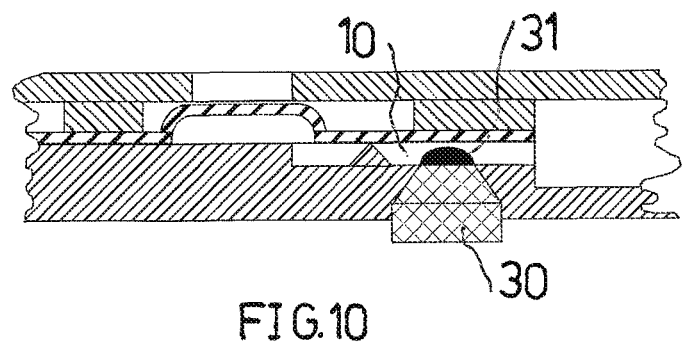
FIGS. 10 to 13 show partial cross sections through a reagent reservoir according to the invention, combined with a carrier for a sample to be analyzed.
Figure 11:
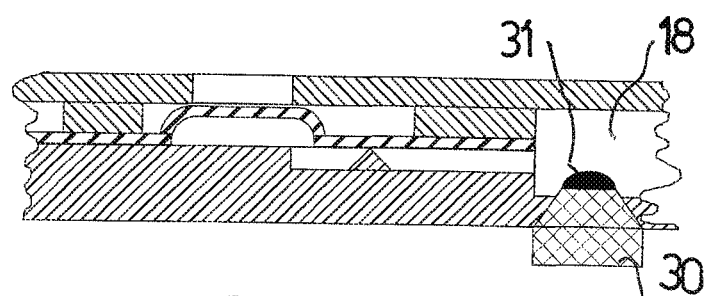

Reagent reservoirs described in FIGS. 10 and 11 are combined with a sample carrier 30 via which a sample 31 to be analyzed, e.g. blood, saliva, urine, tissue, and also plant, food or soil samples, can be introduced into the reagent reservoir by the user in a convenient manner and, in particular, in the desired quantity. The sample carrier 30 with the applied sample 31 can, in accordance with FIG. 10, be fitted on the reagent reservoir in a fluid-tight manner via a plug connection, such that the sample 31 is arranged in the channel 10 and is washed round by the reagent withdrawn from the storage space 8 and at least partially resuspended. Preferably, the sample carrier 30 is introduced into the reagent reservoir via a conical closure piece, e.g. corresponding to the Luer standard. The sample 31 washed from the sample carrier 30 by the reagent flowing over it is delivered for further analysis/processing after leaving the reagent reservoir.

According to FIG. 11, the sample can also be arranged in the discharging chamber 18, where the sample is dissolved under diffusion and incubation and, if appropriate after mixing with a further fluid, is delivered for processing. As in the illustrative embodiment in FIG. 9, the dissolution process can be supported by movement (agitation) of the fluid using mechanical means or by fluid movement.

Figure 12:
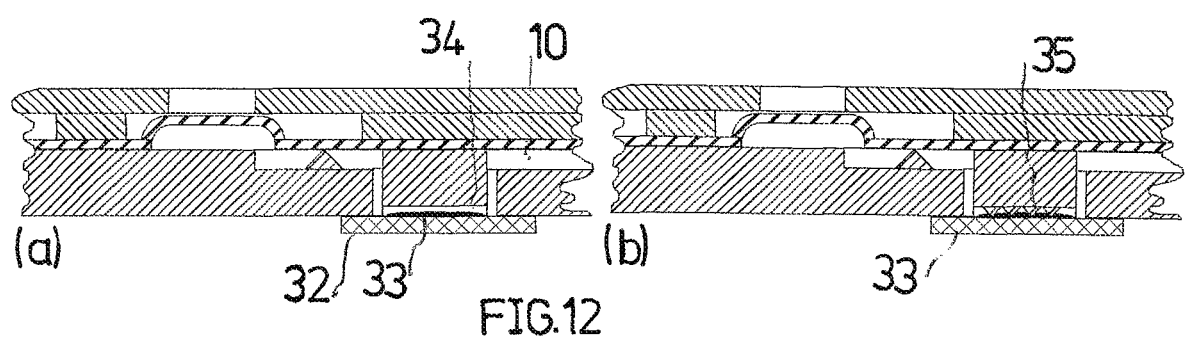
Figure 13:
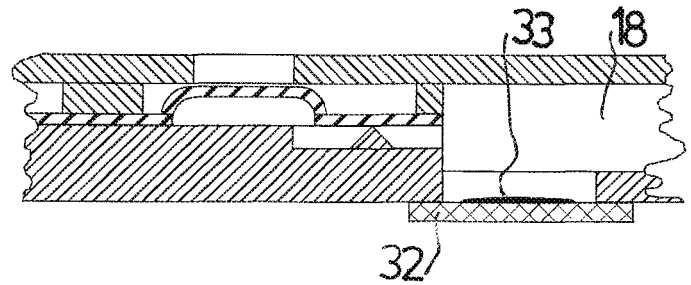

FIGS. 12 and 13 show illustrative embodiments with a plate-shaped sample carrier 32 for receiving a sample 33 to be analyzed. Such samples carriers, known as "absorband pads", are preferably made of nitrocellulose, paper or other porous materials and are generally used to collect samples of bodily fluids, such as saliva, or in drugs tests. The sample carrier 32 is mounted on the underside of the reagent reservoir, where it delimits a portion 34 of the channel 10 routed on the underside of the substrate 1. The sample 33 is also washed from the sample carrier 32, by the fluid emerging from the storage space, and delivered for analysis/processing. In order to maximize the contact surface between fluid and sample, the channel portion 34 can have a meandering, helical or fork-shaped configuration.

The illustrative embodiment of FIG. 12b differs from the illustrative embodiment of FIG. 12a in that, in the channel portion 34, needle-shaped elements 35 just out from the substrate and protrude into the sample 33, thereby enlarging the surface of the area of the sample membrane over which the sample membrane over which the fluid flows and helping to force the sample 33 from the sample carrier 32.

According to the illustrative embodiment in FIG. 13, a plate-shaped sample carrier 32 with a sample 33 adjoins the discharging chamber or mixing chamber 18.

Figure 14:
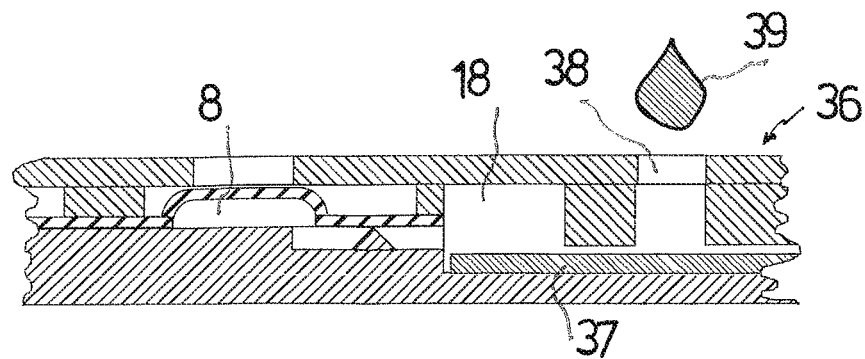
FIG. 14 shows a partial cross section through a reagent reservoir according to the invention, integrated in a lateral flow analysis chip for the analysis of liquids.

FIG. 14 concerns a reagent reservoir which has an integrated analysis chip 36, working according to the lateral flow principle, and has a housing in common with the analysis chip 36. A lateral flow membrane 37 protrudes into the discharging chamber 18 of the reagent reservoir. The lateral flow membrane 37 can be wetted with a sample 39, e.g. a blood sample, through an opening 38. Reagent stored in the storage space 8 forms a buffer liquid for the analysis reactions in the lateral flow membrane.

Costs are reduced by only a single housing being needed for reservoir and analysis chip.

Figure 15:
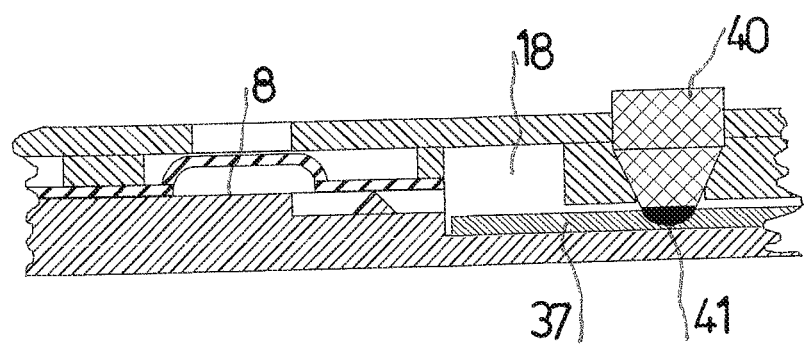
FIG. 15 shows a reagent reservoir according to the invention integrated in a lateral flow analysis chip, combined with a carrier for a solid sample to be analyzed.

In the illustrative embodiment in FIG. 15, instead of dropping a sample liquid onto the lateral flow membrane 37, a solid or liquid sample 41 is brought into contact with a lateral flow membrane 37 by way of a sample carrier 40. As the reagent withdrawn from the storage space flows through the lateral flow membrane 37, the solid sample 41 is flushed off and caused to react.

Figure 16:
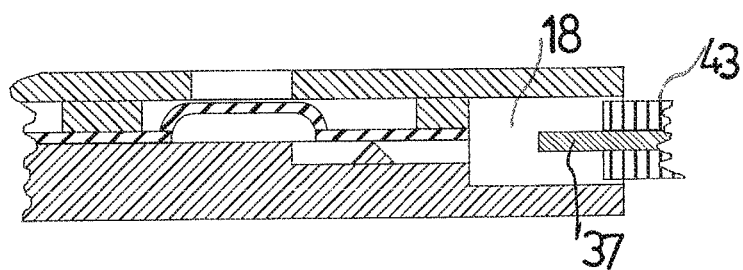
FIG. 16 shows a partial cross section through a reagent reservoir according to the invention, a lateral flow analysis chip being able to be inserted into the discharging chamber of said reagent reservoir.

FIG. 16 shows an illustrative embodiment in which a separate lateral flow analysis module 43 with a lateral flow membrane 37 can be inserted into the discharging chamber 18 of a reagent reservoir.

I claim:

1. A reagent reservoir for fluids as part of a microfluidic flow cell or as a separate module, comprising:
    a storage chamber formed in a substrate;
    opening channels connected to the storage chamber and extending toward a flat bottom surface of the substrate, wherein each of the opening channels opens at a free end of an attachment stub that projects from a bottom of a depression in the flat bottom surface, wherein the attachment stub is closable by welding and is configured so that in the closed state the attachment stub is set back relative to the flat bottom surface so that the reservoir is placeable with the bottom surface in a stable position on an even support surface.

2. The reagent reservoir according to claim 1, further comprising a film that delimits the storage chamber on one side.

3. The reagent reservoir according to claim 2, wherein the storage chamber is further formed by a bulge in the film.

4. The reagent reservoir according to claim 2, further comprising a further channel formed in the substrate and connected to the storage chamber, the film delimiting the further channel on one side, the further channel being closed and openable at a predetermined breaking point by deflection of the film, wherein the predetermined breaking point is breakable by deformation of a portion of the film delimiting the storage chamber, wherein the film delimits the storage chamber and the further channel continuously as far as a mouth where the further channel opens into a discharging and/or mixing chamber.

5. The reagent reservoir according to claim 2, wherein the film is a laminate composed of a metal layer and at least one plastic layer, wherein the plastic layer is directed toward the fluid.

6. The reagent reservoir according to claim 5, wherein the metal layer is an aluminum layer.

7. The reagent reservoir according to claim 6, wherein the aluminum layer is a soft-annealed aluminum layer.

8. The reagent reservoir according to claim 2, wherein the substrate has a surface area provided for welding to the film, the surface area having a furrowed structure.

9. The reagent reservoir according to claim 4, wherein the discharging and/or mixing chamber forms a socket for connecting the reagent reservoir to an appliance.

10. The reagent reservoir according to claim 4, wherein the substrate is connected to an actuator and/or a lid.

11. The reagent reservoir according to claim 10, wherein the actuator and/or the lid is connected to the substrate non-releasably and pivotably.

12. The reagent reservoir according to claim 11, wherein the actuator and/or the lid is connected to the substrate by a film hinge.

13. The reagent reservoir according to claim 10, wherein the actuator comprises a stamp element guided through an opening in the lid and deforms the portion of the film, and the stamp element, in an end position of the actuator annuls a height of the storage chamber by the deformation.

14. The reagent reservoir according to claim 10, wherein the lid and/or the actuator, in a end position, are fixable on the substrate and, optionally, the actuator is fixable on the lid.

15. The reagent reservoir according to claim 14, wherein the actuator is clamped and/or latched onto the substrate or lid.

16. The reagent reservoir according to claim 10, wherein the lid together with the substrate forms the discharging and/or mixing chamber.

17. The reagent reservoir according to claim 4, wherein the reagent reservoir is connectable to a carrier element for a dry reagent or a sample, and the dry reagent and/or the sample is arranged in the channel or the discharging chamber by the carrier element.

* * * * *